United States Patent

[11] 3,570,375

[72] Inventors Russell J. Williams
  Sun City, Ariz.;
  Milton J. Heimos, Affton, Mo.
[21] Appl. No. 729,122
[22] Filed May 14, 1968
  Division of Ser. No. 597,169, Nov. 25, 1966,
  Pat. No. 3,394,871, which is a continuation
  of Ser. No. 340,995, Jan. 29, 1964.
[45] Patented Mar. 16, 1971
[73] Assignee Bemis Company, Inc.
  Minneapolis, Minn.

[54] METHODS OF MANUFACTURING PLASTIC BAGS
  12 Claims, 23 Drawing Figs.
[52] U.S. Cl. .................................................. 93/35,
  156/289
[51] Int. Cl. ...................................... B31b 49/04
[50] Field of Search ......................................... 93/8, 35;
  260/(Ink Digest); 156/289, 290; 229/51 (WB),
  62.5

[56] References Cited
  UNITED STATES PATENTS
3,217,871  11/1965  Lee ............................. 229/51X
3,237,534  3/1966   Lissner ......................... 93/8X
3,319,868  5/1967   Huang et al .................... 229/51X
  FOREIGN PATENTS
225,010    3/1959   Australia ....................... 229/51WB

Primary Examiner—Bernard Stickney
Attorney—Koenig, Senniger, Powers and Leavitt ABSTRACT: A method of manufacturing plastic bags with a plastic tape folded around one end of the bag and heat-sealed to the bag walls with heat-seal-inhibiting material precluding sealing together of the walls where the tape is sealed to the walls. A method of manufacturing plastic bags with a heat-sealed pinch-type closure with heat-seal-inhibiting material precluding sealing together of the walls where the closure is sealed. A method of manufacturing plastic bags with an interrupted or vented heat-sealed longitudinal seam with heat-seal-inhibiting material in a pattern for forming the interrupted or vented longitudinal seam. A method of manufacturing plastic bags with a valve sleeve sealed in a heat-sealed longitudinal seam with heat-seal-inhibiting material on the inside of the sleeve to preclude sealing together of the walls of the sleeve.

Patented March 16, 1971 3,570,375

Russell J. Williams,
Milton J. Heimos,
Inventors.
Koenig, Senniger,
Powers and Leavitt,
Attorneys.

Patented March 16, 1971

Patented March 16, 1971

Patented March 16, 1971

Patented March 16, 1971

Patented March 16, 1971

METHODS OF MANUFACTURING PLASTIC BAGS

This application is a division of our copending application Ser. No. 597,169, filed Nov. 25, 1966 now U.S. Pat. No. 3,394,871, issued Jul. 30, 1968, which is a continuation of our application Ser. No. 340,995, filed Jan. 29, 1964, now abandoned.

The invention is especially concerned with methods of manufacturing bags of flexible heat-sealable sheet material, such as polyethylene, and more particularly bags having an area or areas including a plurality of layers of the heat-sealable material, wherein the layers are in part joined by a heat seal and in part free of one another by reason of inhibition of heat-sealing. This inhibition is effected by providing a coating of a heat-seal-inhibiting material on one of the layers in a pattern such as to inhibit heat-sealing where it is desired that the layers be free of one another.

One phase of the invention utilizing heat-seal-inhibition as above noted involves the provision of methods of manufacturing bags of flexible heat-sealable sheet material, such as polyethylene, with end closures so constructed as to resist failure of the closures despite rough handling of the bags, while minimizing the amount of material required for bags of a given capacity. Another phase of the invention utilizing heat-seal-inhibition as above noted involves the provision of methods of manufacturing bags of such material with a heat-sealed longitudinal seam (a so-called back seam) of the so-called "interrupted" or "zipperproof" type adapted to resist strain better than a continuous line seal (see, for example, U.S. Pat. No. 2,999,042). Another phase of the invention utilizing heat-seal-inhibition as above noted involves the provision of methods of manufacturing bags of such material with vents in the longitudinal seam to allow for escape of air from the bag without causing leakage of the contents of the bag. Still another phase of the invention utilizing heat-seal-inhibition as above noted involves the provision of a method of making a valve bag of such material having a valve sleeve of similar material wherein bag seals are made in the region of the valve sleeve without blocking of the valve sleeve. Other objects and features will be in part apparent and in part pointed out hereinafter.

The invention accordingly comprises the methods hereinafter described, the scope of the invention being indicated in the following claims.

In the accompanying drawings, in which several of various possible embodiments of the invention are illustrated.

Corresponding reference characters indicate corresponding parts throughout the several views of the drawings.

Figures 1, 2, 3, 4, 5:
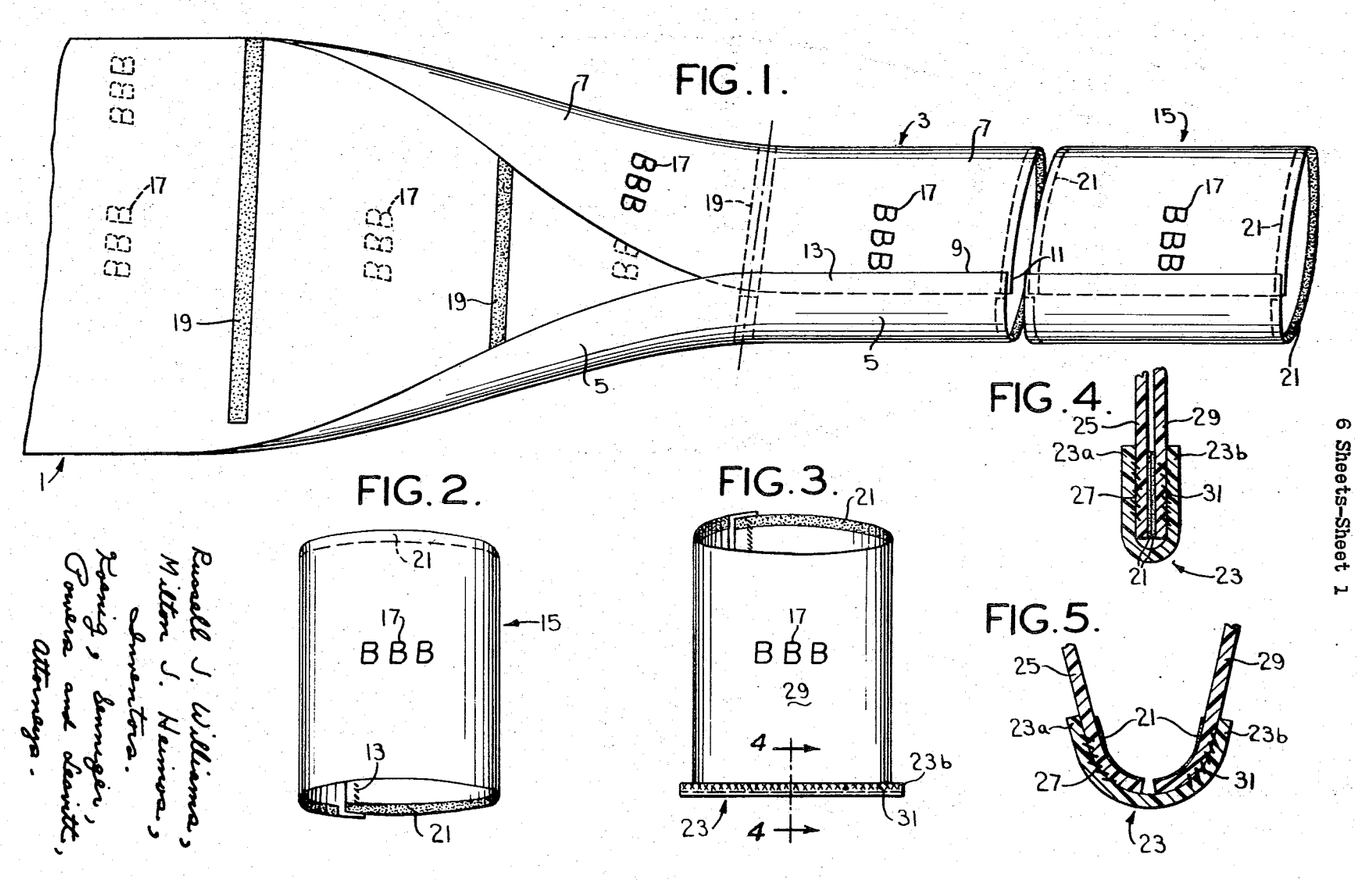
FIG. 1 is a perspective illustrating the manufacture of bag tubes to be provided with end closures of the folded tape type in accordance with this invention.
FIG. 2 is a perspective of a bag tube per se made in accordance with FIG. 1.
FIG. 3 is a perspective showing the FIG. 2 bag tube provided with a folded tape closure at the bottom in accordance with this invention.
FIG. 4 is an enlarged section taken on line 4—4 of FIG. 3.
FIG. 5 is a view similar to FIG. 4 showing the walls of the bag separated.

Referring first to FIG. 1 of the drawings, there is indicated at 1 a continuous web of flexible heat-sealable sheet plastic material such as polyethylene. As appears in FIG. 1, this web is formed into tubing 3 by folding over side marginal portions 5 and 7 of the web into overlapping relation, and heat-sealing together the overlapping margins 9 and 11 of the folded-over side marginal portions 5 and 7 to form a heat-sealed longitudinal tubing seam 13. Tubing 13 is then segmented into individual bag tubes 15 by cutting it transversely on lines spaced at bag length intervals.

Prior to the formation of the web 1 into the tubing 3, the web is printed with any desired matter such as indicated at 17 and further printed with heat-seal-inhibiting material in a predetermined pattern shown as stripes 19, these stripes extending transversely across the web on that face of the web which becomes the inside face of tubing 3 and being spaced at bag length intervals. The heat-seal-inhibiting material may be, for example, a commercially available polyamide-base ink which is unpigmented so as not to appear through the polyethylene. Or, if desired, the ink may be pigmented so that the stripes appear through the polyethylene. The segmenting into bag tubes 15 of the tubing 3 formed from the printed web 1 is effected generally on the center lines of the stripes 19 which extend transversely across the tubing, so that each bag tube has at each end thereof a stripe 21 of heat-seal-inhibiting material, generally half the width of the original stripe 19, extending all around the bag tube on the inside face thereof.

FIG. 2 shows one of the bag tubes 15 formed by the operations illustrated in FIG. 1 with the bag tube opened up and in such perspective as to reveal the stripe 21 of heat-seal-inhibiting material at the bottom of the bag tube. As shown in FIGS. 3—5, the bottom is closed by folding a tape 23 of flexible heat-sealable sheet plastic material such as polyethylene around the bottom of the bag, and applying heat and pressure to the associated tube and tape to effect heat-sealing of one side 23a of the folded tape 23 to the outside of one wall 25 of the bag tube all along a seal 27 extending throughout the width of the tube, and heat-sealing of the other side 23b of the folded tape 23 to the outside of the other wall 29 of the bag tube all along a seal 31 extending throughout the width of the bag tube. The heat-seal-inhibiting pattern at 21 positively and deliberately precludes heat-sealing together of the walls 25 and 29 of the bag tube along the line of the seals at 27 and 31 between the tape 23 and the walls 25 and 29 of the bag. After the resultant bag has been filled through its open mouth, the latter may be closed in the same manner as the bottom.

The bag closure constituted by tape 23 heat-sealed by the seals at 27 and 31 to the outside faces of the bag walls 25 and 29 but without any sealing together of the inside faces of the bag walls in view of the positive inhibition of sealing by the heat-seal-inhibiting material at 21, is a strong closure, stresses incurred on dropping or other rough handling of the filled bag being taken in shear by seals 27 and 31. As will be understood, these seals are strongly resistant to separation in shear. Positive elimination of a face-to-face seal between walls 25 and 29 by means of the heat-seal-inhibiting material at 21 insures preservation of the strength of the seals at 27 and 31. If there were a face-to-face seal between the walls 25 and 29 it would be a weak seal, resisting rupture only by its resistance to peeling apart, and its peel resistance would inherently be low. In this regard, it will be understood that the resistance to rupture of a heat seal in peel is considerably less than its resistance to rupture in shear. The face-to-face seal would tend to peel apart under stresses incurred on rough handling of the bag, and this would tend to weaken the bag along the line of seals 27 and 31. Consequently, the strength of the bag is preserved by positive inhibition of a face-to-face seal between the bag walls along the line of the seals 27 and 31. Moreover, without a face-to-face seal between the bag walls along this line, the capacity of the bag is increased or, conversely, the bag may be shorter for a given capacity. This is because the tape 23 initially forms the end closure at the very end of the bag tube, rather than a face-to-face seal between the bag walls spaced from the end of the bag tube.

It will be understood that stripes 19 (or other suitable pattern) may be printed on the web 1 in the travel of the web through the printing press for printing the matter such as indicated at 17. The latter is shown as printed on that face of the web which becomes the outside face of the bag tubes, and stripes 19 are printed on the other face of the web which becomes the inside face of the bag tubes. Stripes 19 need not be as long as shown. They may be of shorter length and so located laterally in respect to the web as to extend across only one wall of the bag tube. The surface of the web to which the heat-seal-inhibiting ink is applied may be treated for improved adhesion of the ink. When the heat-seal-inhibiting material is applied to only one wall of the bag, it has been found that best results are obtained if the surface of that wall is treated and the surface of the other wall is not treated.

Figure 6:
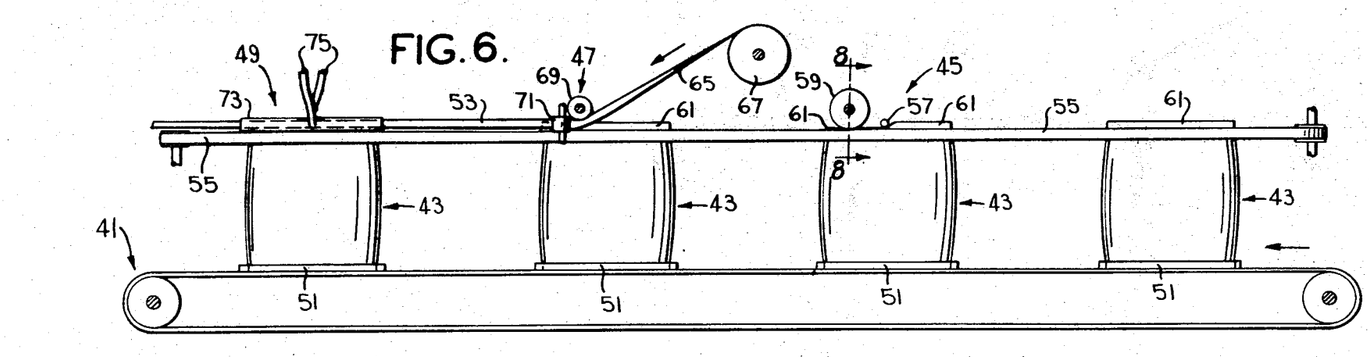
FIG. 6 is a view in side elevation showing how bags may be provided with a top closure of the folded tape type in accordance with this invention.
Figures 7, 8:
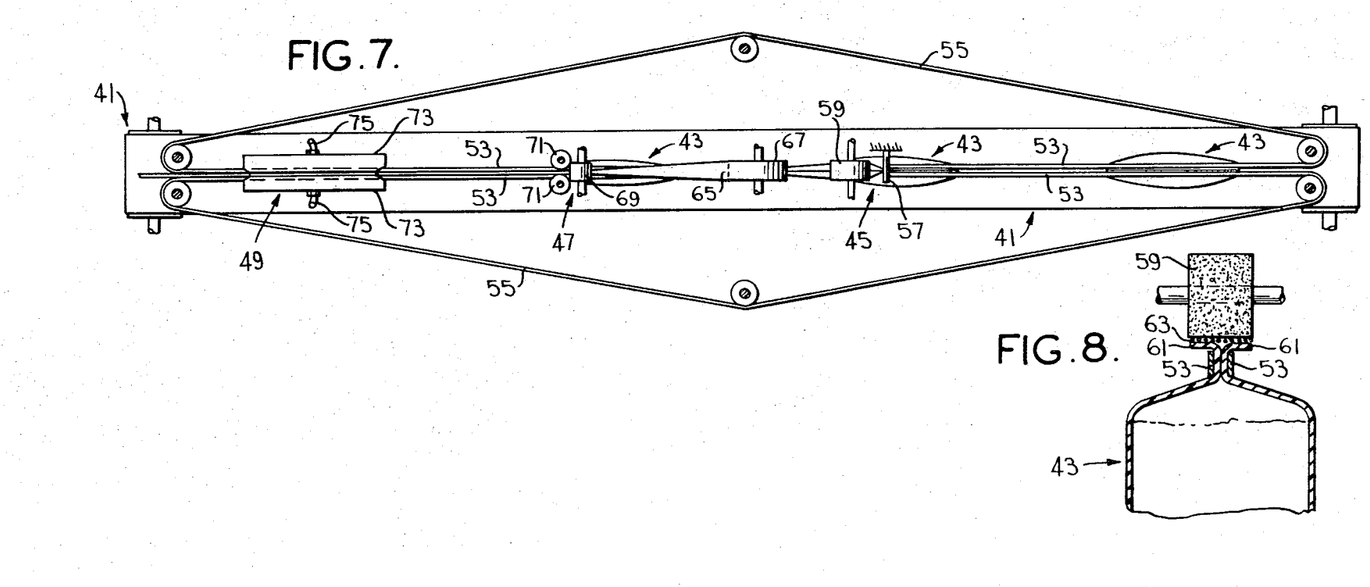
FIG. 7 is a plan of FIG. 6.
FIG. 8 is an enlarged vertical section taken on line 8—8 of FIG. 6.

FIGS. 6—8 illustrate a method of forming bag top closures of the type shown in FIGS. 4 and 5. At 41 in FIGS. 6 and 7 is indicated an endless conveyor for conveying filled bags 43 in the direction from right to left through a first station 45 where heat-seal-inhibiting material is applied, a second station 47 where a tape is applied, and a third station 49 where sealing of the tape to the bag walls is effected. Bags 43 have bottom closures such as indicated at 51, which may be of the type shown in FIGS. 4 and 5, and have been previously filled through their open mouths. They have not previously had heat-seal-inhibiting material applied to the inside of their open mouths. They are fed forward from right to left in upright position by the conveyor 41, and the walls of each bag at its mouth are pinched together and flattened by being caught between opposed reaches 53 of a pair of endless belts 55. These belts are located at such height above the conveyor 41 that the mouth ends of the bags project up above the belts for some distance.

As each bag is fed forward, the leading (the left end) of its flattened mouth portion projecting up above the opposed reaches 53 of the belts 55 engages a pin 57 at station 45, which opens up and flattens out the projecting mouth portion of the bag. The opened-up mouth then passes below and in contact with an inking roller 59 at station 45 which applies heat-seal-inhibiting ink to the opened-up lips 61 at the mouth of the bag as indicated at 63 in FIG. 8. As the bag moves forward past the roller, the heat-seal-inhibiting ink dries, and then the opened-up lips 61 spring back up into opposed face-to-face relation.

At the taping station 47, a tape 65, fed down from a roll 67, is guided over the top edge of the bag by a roller 69, and folded around the top edge by folding rollers 71. At the sealing station 49, the top edge of the bag with the tape 65 thereon passes between a pair of elongate hot air blast chambers 73 which are supplied with heated air via ducts 75. These chambers have air outlets in the sides thereof facing the folded tape 65, and the heated air blows out through these outlets to effect sealing of the tape to the bag walls without face-to-face sealing together of the bag walls due to inhibition of such sealing by the heat-seal-inhibiting material 63 applied at station 45. Portions of tape 65 between bags are cut, and the bags then have top closures of the same type as shown in FIGS. 4 and 5.

Figures 9, 10, 11, 12:
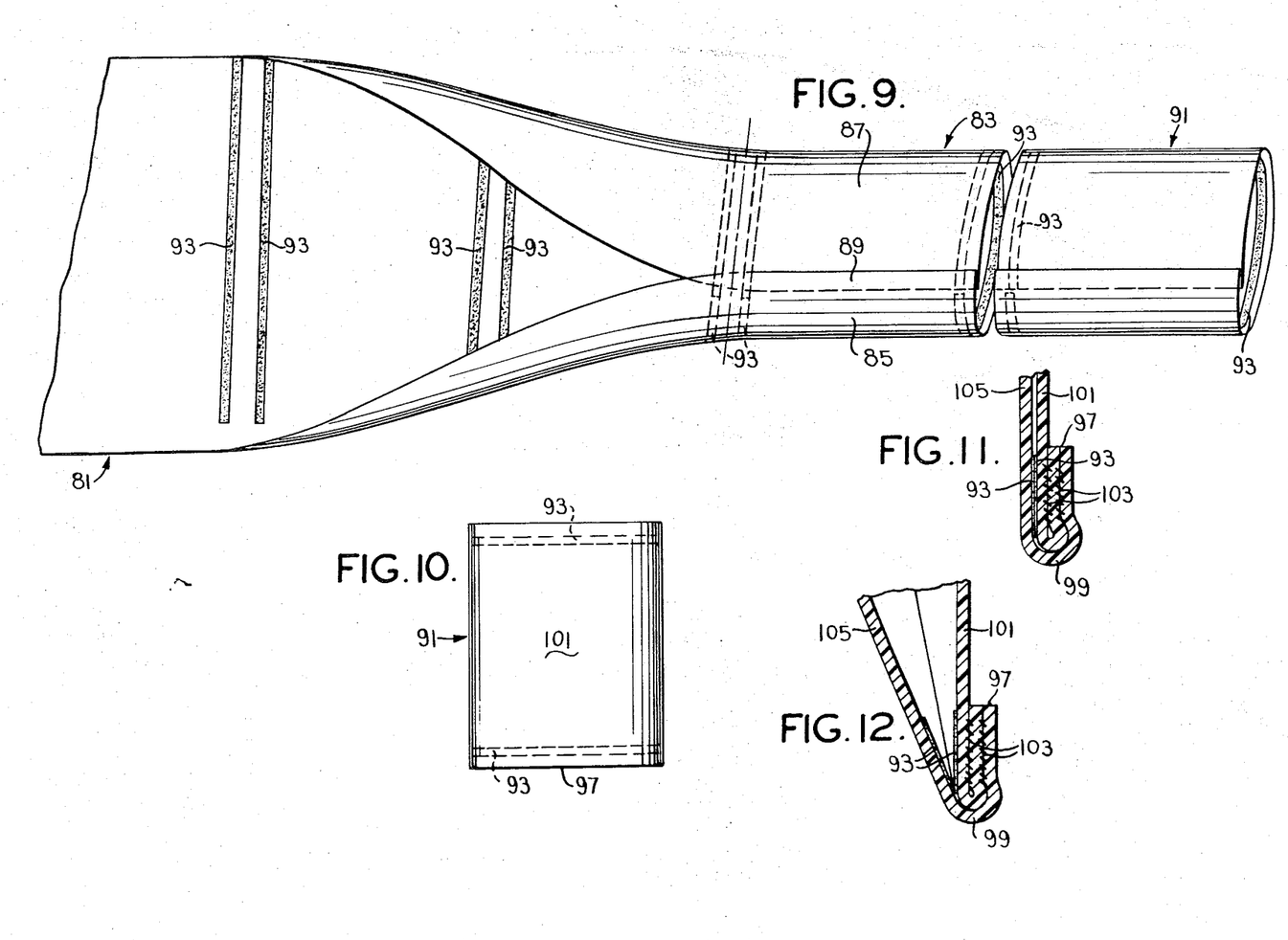
FIG. 9 is a perspective illustrating the manufacture of bag tubes to be provided with end closures of the pinch type in accordance with this invention.
FIG. 10 is a view in elevation of a bag tube per se made in accordance with FIG. 9.
FIG. 11 is an enlarged section through a pinch bottom formed on the FIG. 10 bag tube.
FIG. 12 is a view similar to FIG. 11 showing the walls of the bag separated.

FIG. 9 shows the manufacture of bag tubes for forming bags with pinch type closures in accordance with this invention, FIG. 10 shows a bag tube so made, and FIGS. 11 and 12 show the completed closure. Referring to FIG. 9, there is indicated at 81 a continuous web of flexible heat-sealable sheet plastic material such as polyethylene. This is formed into tubing 83 by folding over side marginal portions 85 and 87 of the web into overlapping relation and heat-sealing of the overlapping margins of the folded-over side marginal portions to form a heat-sealed longitudinal tubing seam at 89. Tubing 83 is then segmented into individual bag tubes 91 by cutting it transversely on lines spaced at bag length intervals.

Prior to the formation of the web 81 into the tubing 83, the web is printed in a pattern comprising pairs of stripes 93 of heat-seal-inhibiting material extending transversely across the web on that face of the web which becomes the inside face of tubing 83. The two stripes of each pair are spaced apart a distance such as shown in FIG. 9, and the pairs are spaced at bag length intervals. The segmenting into bag tubes 91 of the tubing 83 formed from the web 81 is effected generally on lines extending centrally between the two stripes 93 of each pair of stripes, so that each bag tube 91 has a stripe 93 adjacent but spaced from one end and a stripe 93 adjacent but spaced from its other end. Each stripe extends all around the bag tube on the inside face thereof.

FIG. 10 shows one of the bag tubes 91 formed by the operations illustrated in FIG. 9. The lower end portion of the tube below the lower stripe 93 is designated 97. The tube is formed with a pinch type closure by folding portion 97 on a fold line such as indicated at 99 in FIGS. 11 and 12 over onto the outside of one wall 101 of the tube, and then applying heat and pressure to effect sealing together of the portions of the two walls of the tube included in portion 97 and the wall 101 of the tube all along a seal 103 extending throughout the width of the tube. The heat-seal-inhibiting material at 93 positively and deliberately precludes heat-sealing together of wall 101 of the tube and the other wall 105 of the tube all along the line of the seal 103. After the resultant bag has been filled through its open mouth, the latter may be closed by a pinch type closure in the same manner as the bottom. Generally the same considerations apply to this pinch-type closure as to the taped closure of FIGS. 4 and 5.

Figures 13, 14, 15, 16:
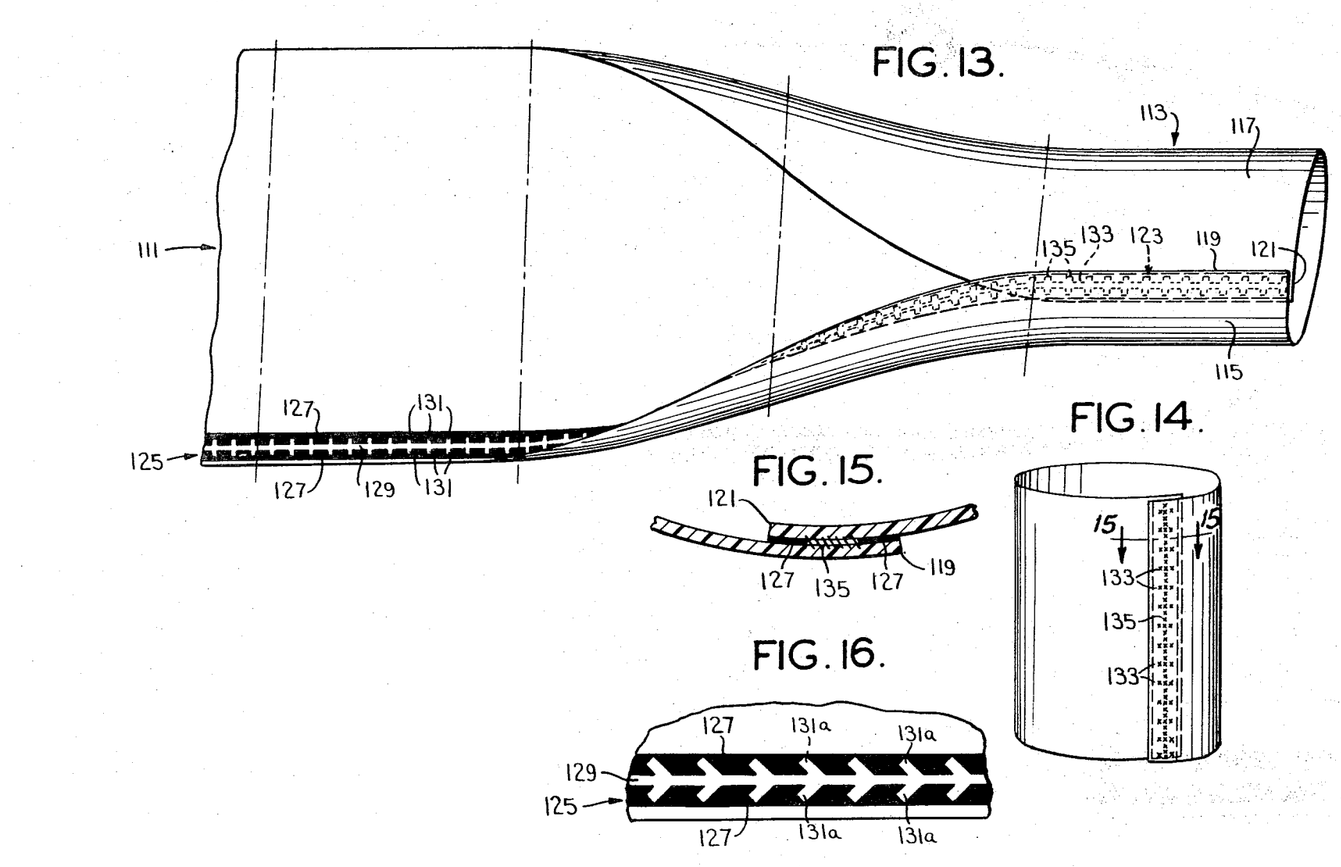
FIG. 13 is a perspective illustrating the manufacture of bag tubing with a longitudinal seam of the interrupted seal type in accordance with this invention.
FIG. 14 is a perspective illustrating a bag tube made from the FIG. 13 tubing.
FIG. 15 is an enlarged section taken on line 15–15 of FIG. 14.
FIG. 16 is a view illustrating an alternative interrupted seal pattern.

FIG. 13 shows the manufacture of bag tubing for forming bags with an interrupted longitudinal seam in accordance with this invention, and FIGS. 14 and 15 illustrate a bag tube segmented from tubing so made. Referring to FIG. 13, there is indicated at 111 a continuous web of flexible heat-sealable sheet material such as polyethylene. This is formed into tubing 113 by folding over side marginal portions 115 and 117 of the web into overlapping relation and heat-sealing the overlapping margins 119 and 121 of portions 115 and 117 to form a heat-sealed longitudinal or back seam at 123.

Prior to the formation of the web into the tubing 113, the web is printed with a stripe 125 of heat-seal-inhibiting material extending continuously along one margin of the web (shown as the margin of the web which becomes the outside overlapping margin 119 in the longitudinal seam) on that face of this margin which becomes opposed to the other margin when the web is tubed. This stripe is of a special pattern such as to form an interrupted seam, shown in FIG. 13 as having longitudinally continuous side bands 127 on opposite sides of an unprinted continuous central band 129, the latter having laterally extending projections 131 at uniformly spaced intervals along the length of the stripe.

In forming the heat-sealed longitudinal seam at 123, heat and pressure are applied in a band of width corresponding generally to the width of the stripe 125. As a result of the interposition of stripe 125 between the overlapping margins 119 and 121 of the web, these margins becoming sealed together at 123 only in the heat-seal pattern of the unprinted central noninhibiting band 129 with its lateral projections 131. Thus, seal 123 is of the so-called interrupted seal type having spaced transversely extending sealed areas 133 and a continuous seal 135 transversing said areas.

FIG. 16 illustrates a different pattern for the heat-seal-inhibiting stripe 125 in which the central noninhibiting band 129 which establishes the heat-seal pattern has angled lateral projections 131a instead of the right-angle projections 131 shown in FIG. 13 for forming interrupted seal areas of chevron shape. Various other suitable interrupted seal patterns may be used.

Figures 17, 18, 19, 20:
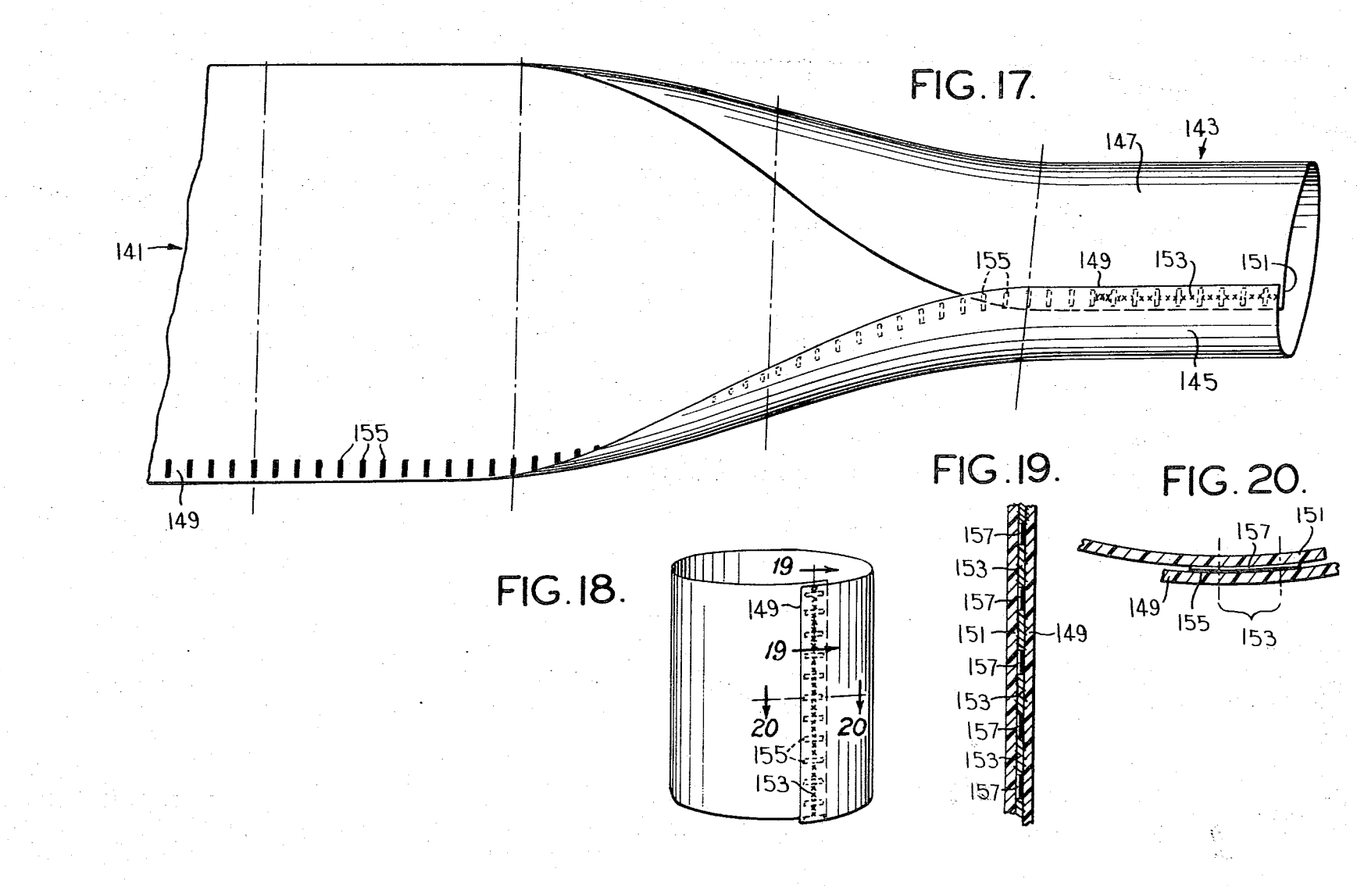
FIG. 17 is a perspective illustrating the manufacture of bag tubing with a vented longitudinal seam in accordance with this invention.
FIG. 18 is a perspective of a bag tube made from the FIG. 17 bag tubing.
FIG. 19 is an enlarged section taken on line 19–19 of FIG. 18.
FIG. 20 is an enlarged section taken on line 20–20 of FIG. 18.

FIG. 17 illustrates the manufacture of bag tubing for forming bags with vents in the longitudinal seam in accordance with this invention, and FIGS. 18—20 illustrate a bag tube segmented from tubing so made. Referring to FIG. 17, there is indicated at 141 a continuous web of flexible heat-sealable sheet material such as polyethylene. This is formed into tubing 143 by folding over side marginal portions 145 and 147 of the web into overlapping relation and heat-sealing the overlapping margins 149 and 151 of portions 145 and 147 to form a heat-sealed longitudinal or back seam at 153.

Prior to the formation of the web into the tubing 143, the web is printed along one margin (shown as the margin of the web which becomes the outside overlapping margin 149 in the longitudinal seam) with a longitudinal series of spots shown as being in the form of transversely extending short stripes 155 of heat-seal-inhibiting material. These spots or strips 155 are spaced at intervals along the stated margin of the web on that face of this margin which becomes opposed to the other margin when the web is tubed. When seam 153 is formed, spots or stripes 155 inhibit sealing at spaced intervals throughout the length of the seam 153 to provide gaps 157 in the seam 153 constituting vents.

Figure 21:
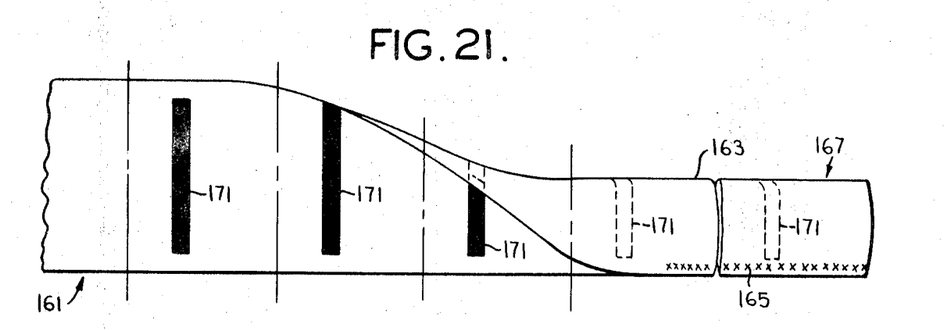
FIG. 21 is a view illustrating the manufacture of valve sleeve for a valve bag made in accordance with this invention.
Figure 22:
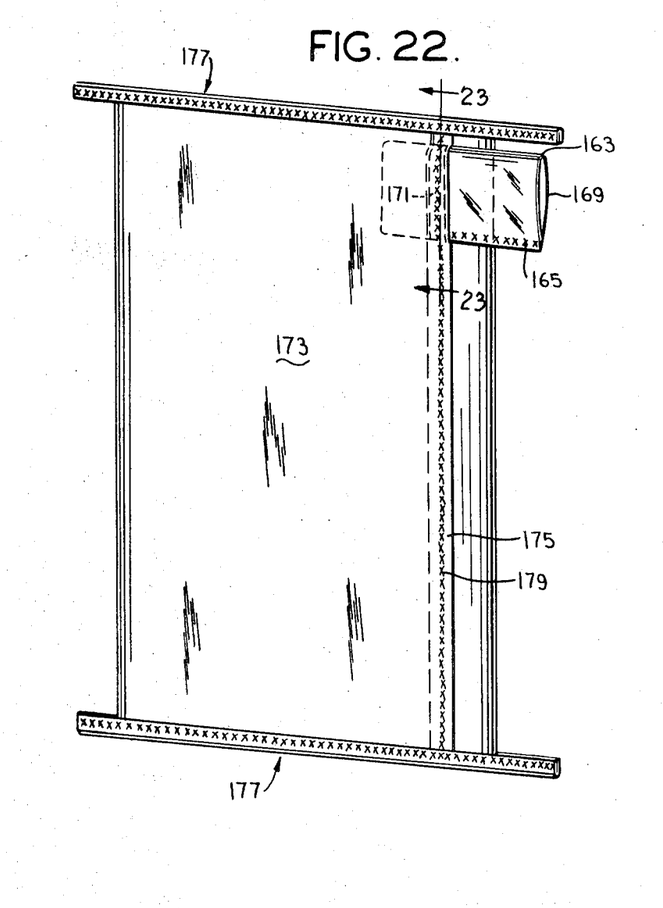
FIG. 22 is perspective of the valve bag.
Figure 23:
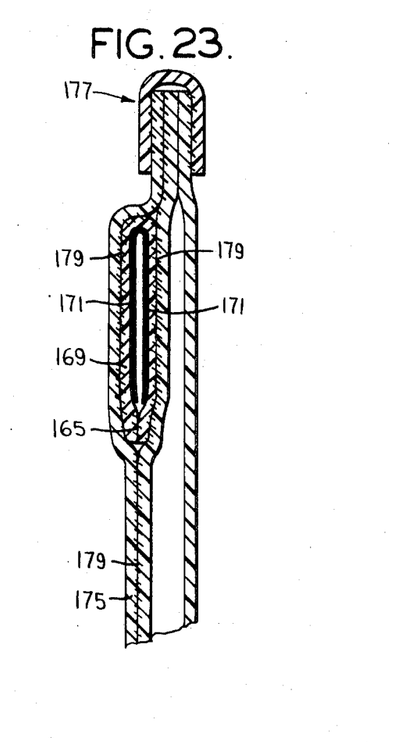
FIG. 23 is an enlarged section taken on line 23–23 of FIG. 22.

FIG. 21 shows the manufacture of valve sleeves for use in valve bags in accordance with this invention, and FIGS. 22 and 23 illustrate a valve bag having one of these sleeves therein. As shown in FIG. 21, a strip of flexible heat-sealable sheet material 161 is folded in half at 163 along its longitudinal center line and its margins are heat-sealed together as indicated at 165 to form flat tubing 167. This tubing is then segmented into valve sleeves such as indicated at 169 in FIG. 22. Prior to the folding of the strip 161, it is printed with stripes 171 of heat-seal-inhibiting material, these stripes extending transversely across the strip on that face of the strip which becomes the inside face of the tubing 167, and being spaced at sleeve length intervals. The segmenting of the tubing into sleeves is effected on transverse lines spaced at sleeve length intervals and lying intermediate the stripes.

FIGS. 22 and 23 show a bag 173 formed from a bag tube made of flexible heat-sealable sheet material such as polyethylene having a heat-sealed longitudinal seam 175 and end closures 177. The latter may be of the type shown in FIGS. 4 and 5. Prior to the formation of the heat seal 179 of the seam 175, a valve sleeve 169 is inserted in the longitudinal seam (i.e., between the overlapping margin of the bag material constituting the seam) with heat-seal-inhibiting stripe 171 of the sleeve in register with the ultimate line of heat seal 179. When heat seal 179 is made, sleeve 169 becomes sealed into the seam 175 as shown in FIG. 23. However, the heat-seal-inhibiting stripe 171 prevents sealing together of the walls of the sleeve when heat seal 179 is made, thereby preventing blocking of the sleeve.

In view of the above, it will be seen that the several objects of the invention are achieved and other advantageous results attained.

As various changes could be made in the above methods without departing from the scope of the invention, it is intended that all matter contained in the above description or shown in the accompanying drawings shall be interpreted as illustrative and not in a limiting sense.

We claim:
1. The method of making bags of flexible heat-sealable sheet material comprising applying to one face of a web of said material stripes of heat-seal-inhibiting material extending transversely of the web and spaced at bag length intervals, forming the web into tubing with the stripes on the inside of the tubing; segmenting the tubing into individual bag tubes each having a stripe of said heat-seal-inhibiting material on the inside thereof and adjacent one end thereof, and then forming a heat-sealed end closure at said one end of each tube with said stripe precluding heat-sealing together of the walls of the tube inward of the closure.

2. The method of claim 1 wherein said end closure is formed by folding a tape of flexible heat-sealable sheet material around said one end of the tube and effecting heat-sealing of one side of the tape to the outside of one wall of the tube and heat-sealing of the other side of the tape to the outside of the other wall of the tube along a line of seal extending transversely of the tube throughout the width of the tube, said line of seal being in register with said stripe and the latter precluding heat-sealing together of the walls of the tube along said line of seal.

3. The method of claim 1 wherein said tubes are segmented on lines such that each has a stripe spaced inward from one end of the tube, said end closure being formed by folding the end portion of the tube lying outward of said stripe over on the outside of one of the walls of the tube, and by heat-sealing together the portions of said walls included in said end portion and the outside face of said one wall of the tube along a line of seal extending transversely of the tube throughout the width of the tube, said line being in register with said stripe and the latter precluding heat-sealing together of the walls of the tube inward of the closure.

4. The method of forming an end closure at the mouth of a filled open-mouth bag made of flexible heat-sealable sheet material comprising spreading open lip portions of the walls of the bag at the mouth of the bag, applying a coating of heat-seal-inhibiting material to at least one of these lips, bringing the lips back together, folding a tape of flexible heat-sealable sheet material over the lips, and heat-sealing one side of the tape to the outside of one lip and the other side of the tape to the outside of the other lip along a line of seal extending transversely of the bag throughout the width of the bag in register with said coating, the latter precluding heat-sealing together face-to-face of said lips.

5. The method of making bag tubes of flexible heat-sealable sheet material comprising applying to one face of one margin of a web of said material a coating of heat-seal-inhibiting material in a predetermined pattern extending longitudinally of the web and outlining a predetermined heat-seal pattern, forming the web into tubing with said one margin lapping the other margin of the web and with said coating between said lapping margins, and applying heat and pressure to said lapping margins to effect face-to-face sealing of said margins in said heat-seal pattern excluding sealing of said margins where inhibited by said coating.

6. The method of claim 5 wherein the pattern of said coating is such as to provide an interrupted heat seal between said margins.

7. The method of claim 6 wherein the pattern of said coating is such as to provide an interrupted heat seal comprising spaced transversely extending sealed areas and a continuous longitudinal seal traversing said areas.

8. The method of claim 5 wherein the pattern of said coating is such as to leave gaps in the seal between said margins for venting purposes.

9. The method of making a valve bag of flexible heat-sealable sheet material with a valve sleeve of flexible heat-sealable sheet material comprising applying to one face of a strip of flexible heat-sealable sheet material stripes of heat-seal-inhibiting material extending transversely across the strip and spaced at valve sleeve length intervals, forming said strip into tubing with the stripes on the inside of the tubing, segmenting the tubing into individual sleeves on lines spaced at sleeve length intervals and intermediate said stripes so that each sleeve has a stripe intermediate its ends, inserting each sleeve between portions of a bag tube formed from flexible heat-sealable sheet material, and heat-sealing said sleeve in place between said portions along a line in register with said stripe, the latter precluding sealing together of opposite sides of the sleeve.

10. The method of claim 9 wherein the bag tube has a longitudinal seam including overlapping margins of the bag tube material, the sleeve being inserted between said margins with the stripe in register with said margins, and said seam being heat-sealed after insertion of the sleeve.

11. The method of making bags of flexible heat-sealable sheet material comprising applying heat-seal-inhibiting material to one face of a web of said material; forming the web into tubing with said heat-seal-inhibiting material on the inside of the tubing; segmenting the tubing into individual bag tubes each having heat-seal-inhibiting material on the inside thereof and adjacent one end thereof, and then forming a heat-sealed end closure at said one end of each tube with said heat-seal-inhibiting material precluding heat-sealing together of the walls of the tube inward of the closure in the region of said heat-seal-inhibiting material.

12. The method of claim 11 wherein said end closure is formed by folding a tape of flexible heat-sealable sheet material around said one end of the tube and effecting heat-sealing of one side of the tape to the outside of one wall of the tube and heat-sealing of the other side of the tape to the outside of the other wall of the tube along a line of seal extending transversely of the tube, said heat-seal-inhibiting material precluding heat-sealing together of the walls of the tube along said line of seal in the region of said heat-seal-inhibiting material.